United States Patent
Ichikawa et al.

(10) Patent No.: US 6,680,802 B1
(45) Date of Patent: Jan. 20, 2004

(54) HEAD-MOUNTED IMAGE VIDEO DISPLAY

(75) Inventors: Hirotoshi Ichikawa, Hachioji (JP); Ryotaro Hanayama, Sagamihara (JP); Fuminori Ueno, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 10/048,015

(22) PCT Filed: Aug. 2, 2000

(86) PCT No.: PCT/JP00/05164

§ 371 (c)(1),
(2), (4) Date: Jan. 28, 2002

(87) PCT Pub. No.: WO01/11877

PCT Pub. Date: Feb. 15, 2001

(30) Foreign Application Priority Data

Aug. 5, 1999 (JP) ............................................ 11-222855
Nov. 2, 1999 (JP) ............................................ 11-312169

(51) Int. Cl.⁷ .............................................. G02B 27/14
(52) U.S. Cl. ...................................... 359/630; 359/632
(58) Field of Search ................................ 359/630, 632, 359/505, 629

(56) References Cited

U.S. PATENT DOCUMENTS

| | | | | |
|---|---|---|---|---|
| 5,739,893 A | * | 4/1998 | Karasawa et al. | ........... 351/158 |
| 5,742,263 A | * | 4/1998 | Wang et al. | .................... 345/8 |
| 6,097,352 A | * | 8/2000 | Zavracky et al. | .............. 345/7 |
| 6,356,437 B1 | * | 3/2002 | Mitchell et al. | ............ 361/683 |
| 6,384,982 B1 | * | 5/2002 | Spitzer | ....................... 359/630 |
| 6,441,978 B1 | * | 8/2002 | Kobayashi et al. | ......... 359/834 |
| 2002/0036597 A1 | * | 3/2002 | Chigira et al. | ................. 345/8 |

FOREIGN PATENT DOCUMENTS

| | | |
|---|---|---|
| JP | 04-058212 | 2/1992 |
| JP | 08-305298 | 11/1996 |
| JP | 08-302453 | 12/1996 |
| JP | 10-039784 | 2/1998 |
| JP | 10-074051 | 3/1998 |
| JP | 10-075408 | 3/1998 |
| JP | 10-123455 | 5/1998 |

* cited by examiner

*Primary Examiner*—Ricky Mack
*Assistant Examiner*—Brandi N Thomas
(74) *Attorney, Agent, or Firm*—William H. Bollman

(57) ABSTRACT

A one-eye viewing type head-mounted image display device (1) that is compact and comfortably wearable consists mainly of a viewer (2) and an elastic member (38). The viewer includes an LCD (13), a main prism (32), a see-through prism (33), a frame (10), and a microphone (18). The main prism conducts an image, which is displayed on the LCD, to make the image viewable with either the user's right eye or left eye. The see-through prism is bonded to the main prism, transmits extraneously light, and conducts the light to a users eye. The frame bears the LCD at a predetermined position relative to the prisms. The microphone is mounted in the frame. The elastic member includes a nose rest (38a) which supports the viewer so that the viewer will be located at a predetermined position in front of the user's eye.

7 Claims, 10 Drawing Sheets

HEAD-MOUNTED IMAGE VIDEO DISPLAY

TECHNICAL FIELD

The present invention relates to a head-mounted image display device, or more particularly, a head-mounted image display device for use in viewing an image displayed on an image display element.

BACKGROUND ART

In recent years, various types of head-mounted image display devices have been proposed to enable a user to readily enjoy a large-size image. The present inventor has commercialized a head-mounted image display device that employs a free-form surface prism so as to be lightweight and offer high image quality.

The head-mounted image display device is connected to an image source, for example, a television, a video player, or a DVD player, thus receiving a video signal or an audio signal from the image source. An LCD and an optical system incorporated in the head-mounted image display device projects an image on user's eyes. Moreover, earphones that are an accessory are used to radiate sounds to the user's ears.

Various head-mounted image display devices have been proposed to be adopted as a display device that is used with, for example, a personal computer, a word processor, or any other office automation equipment and that displays images.

Furthermore, the head-mounted image display device falls into a type of displaying an image on user's eyes and a type of displaying an image on either of the user's right or left eye. Various proposals have been made for the latter type of displaying an image on one of user's eyes.

For example, Japanese Patent Unexamined Publication No. 4-58212 describes a display for office automation (OA) equipment. The display consists mainly of an image projector, a light path deflecting member, and a head-mounted member. The light path deflecting member is positioned to conduct light, with which an image is displayed and which is emitted from the image projector, in a predetermined direction. The head-mounted member bears the image projector and light path deflecting member. The image projector consists mainly of an optical image display means and an optical member. The optical image display means has a display surface on which an image is displayed according to an output signal of a main unit of the OA equipment. The optical member projects light, with which an image is displayed and which is emitted from the display surface, to the light path deflecting member. The display is designed to maintain a proper distance between the eye and a display image.

Moreover, Japanese Patent Unexamined Publication No. 10-74051 describes a head-mounted display device having an image display means and a holding means. The holding means can be worn on an observer's head while holding the image display means. The head-mounted display device introduces light; with which an image is displayed and which is emitted from the image display means, to one of the observer's eyes. The holding means can hold the image display means while being worn on either the right region of the head or the left region thereof.

Japanese Patent Unexamined Publication No. 10-123455 describes a head-mounted display device having an image display means and a holding means that holds the image display means and can be worn on an observer's head. The image display means includes a means for emitting light, with which an image is displayed, to a point in front of an observer, an arm that is extended forwards from one side of the observer, and an optical element attached to the front end of the arm. The head-mounted display device uses the optical element to change the light path of the light, with which an image is displayed, and thus introduces the light to the observer's eye. The optical element is coupled to the arm so that it can be displaced in order to escape from extraneous force that works on the optical element from forward.

Japanese Patent Unexamined Publication No. 10-75408 describes a head-mounted display device having an image display means and a holding means that holds the image display means and that can be worn on an observer's head. The holding means includes a supporting member and at least four pad members that are coupled to the supporting member. The supporting member can be elastically deformed so that the pad members can apply elastic force to back and front parts on the right region of the observer's head and back and front parts on the left region thereof, and can thus press the back and front parts.

Japanese Patent Unexamined Publication No. 10-39784 describes a head-mounted display device having a means for emitting light with which an image is displayed, a light path changing means, and a holding means. The light path changing means is located in front of an observer. The holding means holds the means for emitting light with which an image is displayed and the light path changing means and can be worn on the observer's head. The light path changing means can change the light path of the light with which an image is displayed so that a virtual image of an object of observation will be formed in front of the observer. The means for emitting the light with which an image is displayed and the light path changing means are coupled to the holding means so that they can be moved together over the spherical surface of the holding means. The center of the spherical surface is aligned with a position that is closer to the observer than to the light path changing means.

Japanese Patent Unexamined Publication No. 8-305298 describes a head-mounted display device that is worn on an observer's head and that has an image display unit and a head-mounted holder which holds the display unit. When the head-mounted display device is worn on an observer's head, if the observer's line of sight is aligned with a front direction, an image is displayed outside a field-of-view range on the display unit. If the observer's line of sight is aligned with any direction other than the front direction, an image is displayed within the field-of-view range on the display unit. If the observer's line of sight is aligned with the front direction, the components of the head-mounted display device are brought to substantially outside the field-of-view range.

Japanese Patent Unexamined Publication No. 8-320453 describes a display device that is worn by an observer and has an image display unit and a holder for holding the display unit. An image-displayed position can be changed within an observer's discernible range.

In recent years, personal computers that enable a user to enter sentences or operation commands by voice have been put on the market. For example, a user wears a microphone-inclusive headphone or the like on the user's head so as to enter voice.

The microphone-inclusive headphone has right and left headphones linked by, for example, a headband. An arm is extended from the side surface of one of the headphones, and a microphone is fixed to the distal end of the arm.

The foregoing microphone-inclusive headphone has the a microphone thereof located in front of the user's mouth using the arm thereof. The arm therefore extends in front of the user's face. Since the headphone is large in size, the headphone may be hard to handle or may be worn uncomfortably. The adaptation of the structure, which has the microphone attached to the arm, to a head-mounted image display device as it is cannot always be said to be the best.

Moreover, a viewer that displays an image and projects it on a user's eye must maintain a predetermined positional relationship relative to the eye despite a little movement of the head. If the positional relationship is maintained insufficiently, an image to be observed may fluctuate or a distance from an eye may change. This causes a user to feel uncomfortable. A technology for reliably bearing the viewer relative to the eye is therefore needed.

Accordingly, an object of the present invention is to provide a head-mounted image display device that is compact and can be worn comfortably.

DISCLOSURE OF INVENTION

According to a first aspect of the present invention, there is provided a head-mounted image display device having a viewer located in front of a user's eye so as to make an image viewable. The viewer includes an image display element, an optical system, and a frame member. The optical system conducts an image, which is displayed on the image display element, so that the image can be viewed. The frame member bears the image display element at a predetermined position relative to the optical system. The head-mounted image display device has a microphone, which converts voice into an electric signal, mounted on the frame member.

According to a second aspect of the present invention, the head-mounted image display device in accordance with the first aspect may be disposed opposite the user's right eye so that an image displayed on the viewer can be viewed with the right eye or may be disposed opposite the user's left eye so that the image can be viewed with the left eye. The microphone is mounted on the frame member so that depending on whether the head-mounted image display device is disposed opposite the user's right eye or left eye, the microphone will be located at either of substantially symmetric positions on the user's head and will be separated from the user's mouth by substantially the same distance.

According to a third aspect of the present invention, there is provided a head-mounted image display device having a viewer located in front of a user's eye so as to make an image viewable. The viewer includes an image display element, an optical system that conducts an image, which is displayed on the image display element, so that the image can be viewed, and a frame member that bears the image display element at a predetermined position relative to the optical system. The head-mounted image display device further includes a supporting member that contacts a user's face to support the viewer so that the viewer will have a predetermined positional relationship to the user's eye.

According to a fourth aspect of the present invention, in the head-mounted image display device in accordance with the third invention, the supporting member is made of an elastic material. This is intended that the, supporting member can alleviate pressure which occurs when the supporting member contacts the user's face, and the supporting member can elastically deform in conformity with the shape of a region of the user's head which the supporting member contacts.

According to a fifth aspect of the present invention, in the head-mounted-image display device in accordance with the fourth aspect, the supporting member is shaped to contact a region of a user's face in which a bone lies subcutaneously close to the skin.

According to a sixth aspect of the present invention, in the head-mounted image display device in accordance with the fifth aspect, the supporting member is shaped to contact a region in which at least one of the nasal bone, cheekbone, and superior ocular bone lies subcutaneously close to the skin.

According to a seventh aspect of the present invention, in the head-mounted image display device in accordance with the fourth aspect, the supporting member is formed substantially covering along the perimeter of the viewer in order to block the gap between the viewer and a user's eye.

According to an eighth aspect of the present invention, in the head-mounted image display device in accordance with the third aspect, the supporting member covers the optical system and has a portion thereof shaped not to interfere with viewing of an image or scenery conducted by the optical system.

According to a ninth aspect of the present invention, there is provided a head-mounted image display device having a viewer located in front of a user's eye so as to make an image viewable. The viewer includes an image display element, an optical system, and a frame member. The optical system conducts an image, which is displayed on the image display element, so that the image can be viewed. The frame member bears the image display element at a predetermined position relative to the optical system. The head-mounted image display device further includes an electric circuit board for a display element, an illuminating member, an electric circuit board for illumination, and a connector. The electric circuit board for a display element has the image display element mounted thereon. The illuminating member illuminates the image display element. The electric circuit board for illumination has the illuminating member mounted thereon. The connector connects the electric circuit board for a display element and the electric circuit board for illumination to each other so as to be able to disconnect the electric circuit boards each other.

According to a tenth aspect of the present invention, in the head-mounted image display device in accordance with the ninth aspect, the electric circuit board for illumination is held in the frame member or an illuminating member-fixing member that is fixed in the frame member. The surface of a portion of the frame member or fixing member that holds the electric circuit board for illumination is formed as a diffusing/reflecting surface that homogenizes and reflects light emanating from the illuminating member.

According to an eleventh aspect of the present invention, there is provided a head-mounted image display device having a viewer located in front of a user's eye so as to make an image viewable. The viewer includes an image display element, an optical system, and a frame member. The optical system conducts an image, which is displayed on the image display element, so that the image can be viewed. The frame member bears the image display element at a predetermined position relative to the optical system. The frame member bears the image display element so as to at least substantially seal the image display element. Thus, the viewer is substantially sealed.

BEST MODE FOR CARRYING OUT THE INVENTION

An embodiment of the present invention will be described with reference to the drawings below.

FIG. 1 to FIG. 15 show an embodiment of the present invention.

A head-mounted image display device 1 is worn on the user's head, and enables the user to view an image with one of his/her right and left eyes. The head-mounted image display device 1 is of a type allowing a user to hear sounds with one of his/her right and left ears.

Figure 1:
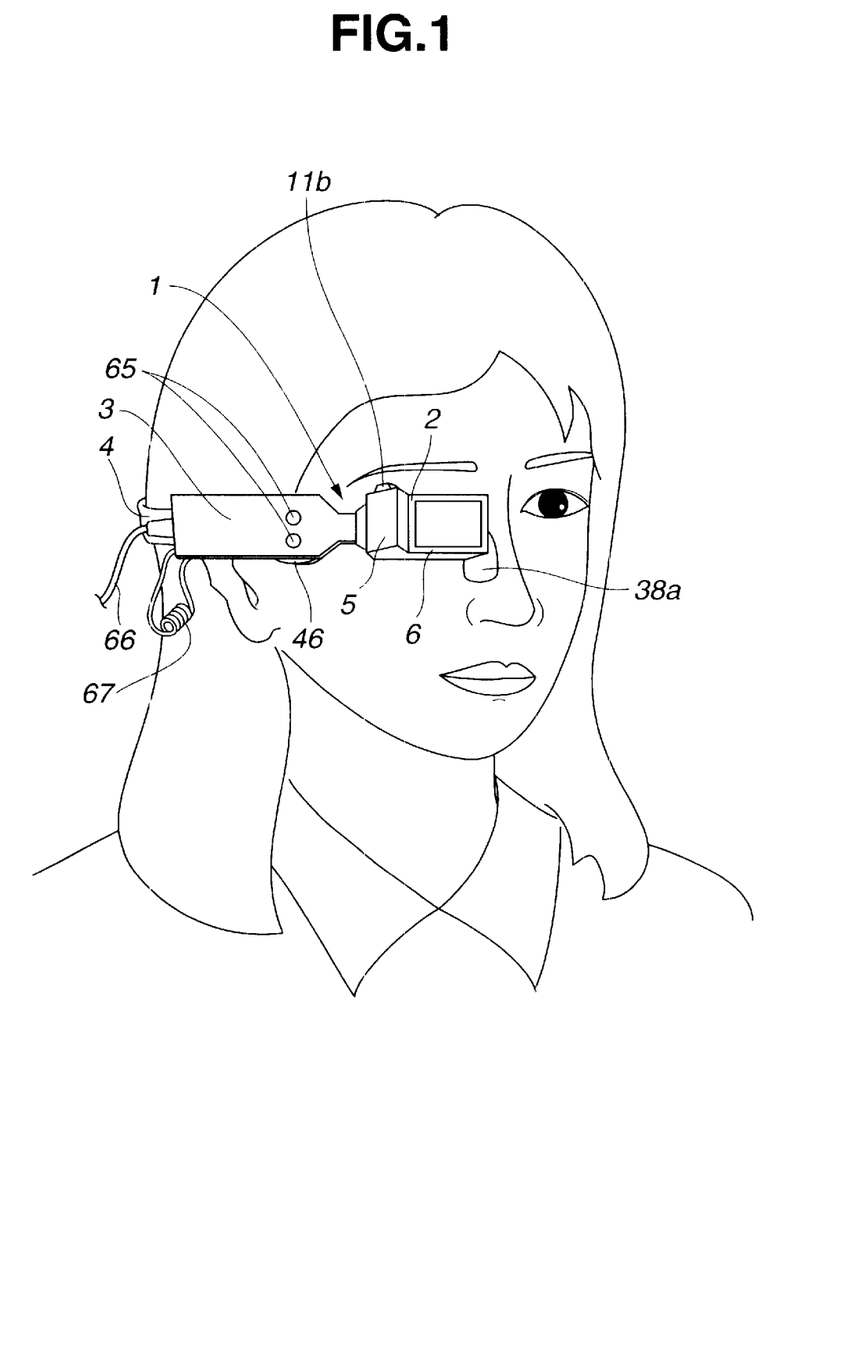
FIG. 1 is a perspective view showing a head-mounted image display device in accordance with an embodiment of the present invention that is worn on the user's head.

FIG. 1 shows a state of using the head-mounted image display device 1 in which a user can view an image with his/her right eye. The region of the user's head on which the head-mounted image display device 1 is worn may be reversed laterally, whereby the head-mounted image display device 1 can be used to view an image with the user's left eye. In this case, an image displayed on an LCD that will be described later is rotated 180° so that the image can be optimally viewed with the user's left eye.

The head-mounted image display device 1 consists mainly of a viewer 2, an arm 3, and a headband 4. The viewer 2 incorporates an LCD 13 (see FIG. 6) that is an image display element for displaying an image sent from an image source, for example, a personal computer, and an optical system including a prism. The arm 3 bears the viewer 2 so that the viewer 2 can pivot, and has a main circuit board 20, which will be described later, incorporated therein. The headband 4 is used to wear the arm 3 on the head with a plurality of pads between them. At this time, the arm 3 is held to be able to rock and slide freely.

The viewer 2 consists mainly of an LCD frame 5 and a main prism assembly 6.

The LCD frame 5 has the reflective LCD 13, an LCD substrate 14, an LCD drive circuit substrate 15, LEDs 16, an LED substrate 17, and an illumination prism 28 incorporated in a frame 10. The frame 10 is a frame member made of a metal material that does not transmit light and that is less susceptible to a change in temperature or humidity. The frame 10 is substantially sealed to be waterproof and dust-proof or to cope with electromagnetic waves or dissipated heat. The LCD substrate 14 is an electric circuit board for a display element on which the LCD 13 is mounted. The LCD drive circuit substrate 15 mounts a drive circuit for driving the LCD 13. The LEDS 16 serve as an illuminating member for time-sequentially irradiating illumination light rays of red, green, and blue to the reflective LCD 13. The LEDs 16 are mounted on the LED substrate 17 that is an electric circuit board for illumination. The illumination prism 28 conducts light, which is emanated from the LED 16, to the LCD 13.

The LCD frame 5 has the illumination prism 28, LCD substrate 14, and LCD drive circuit substrate 15 fixed in a first frame 11. The first frame 11 has a transparent window 31 or a diffraction optical element fixed in a window frame 11a. Thereafter, a second frame 12 is integrated with the first frame, whereby the substantially sealed frame 10 is constructed. Thus, the frame 10 consists of the first frame 11 and second frame 12.

Figure 11:
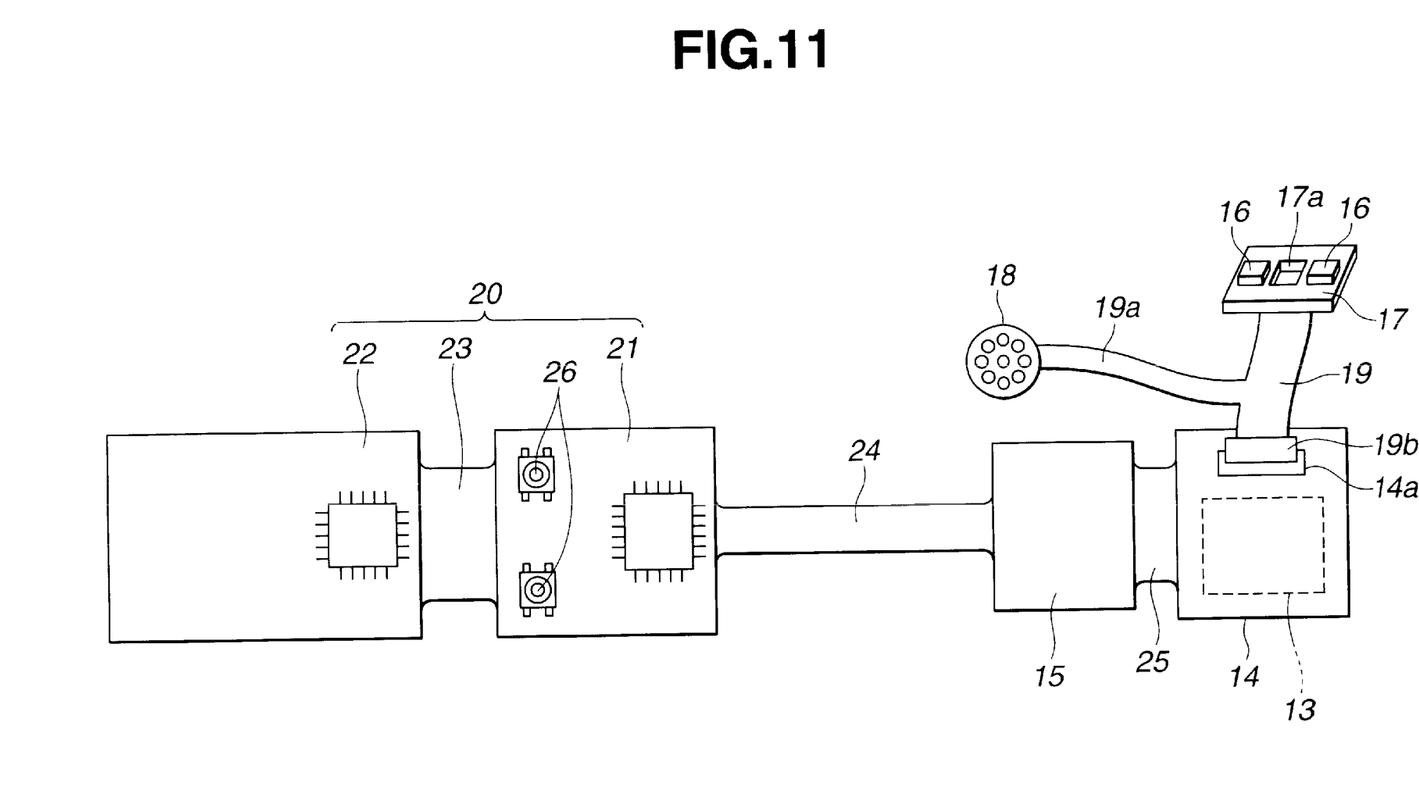
FIG. 11 shows the structure of an electric circuit board incorporated in the head-mounted image display device in accordance with the embodiment.

FIG. 11 shows the arrangement of the electric circuit boards in the head-mounted image display device 1. Specifically, an image processing circuit for reversing an image and a control circuit or the like for extending control according to a operation performed on any of a plurality of switches 26 are mounted on two rigid circuit boards 21 and 22. The rigid circuit boards 21 and 22 are linked by a flexible printed-circuit board 23, thus constructing the main circuit board 20. The LCD drive circuit substrate 15 is connected to the main circuit board 20 with a flexible printed-circuit board 24 between them. The LCD substrate 14 is connected closely to the LCD drive circuit substrate 15 with a flexible printed-circuit board 25 between them. A connector 19b formed at an end of a flexible printed-circuit board 19 is joined with a connector receptacle 14a formed in the LCD substrate 14. Thus, the LED substrate 17 is connected to the LCD substrate 14. A microphone 18 is coupled to a branch 19a of the flexible printed-circuit board 19.

Figure 6:
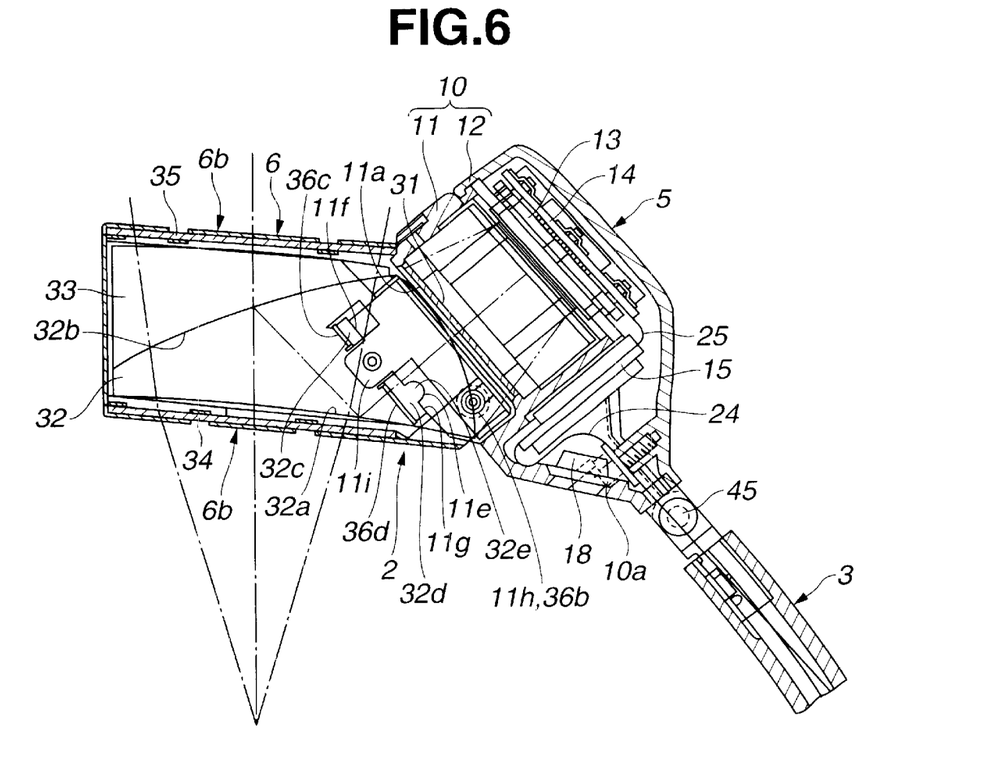
FIG. 6 is a partly enlarged sectional plan view showing the structure of a viewer included in the head-mounted image display device in accordance with the embodiment.
Figure 7:
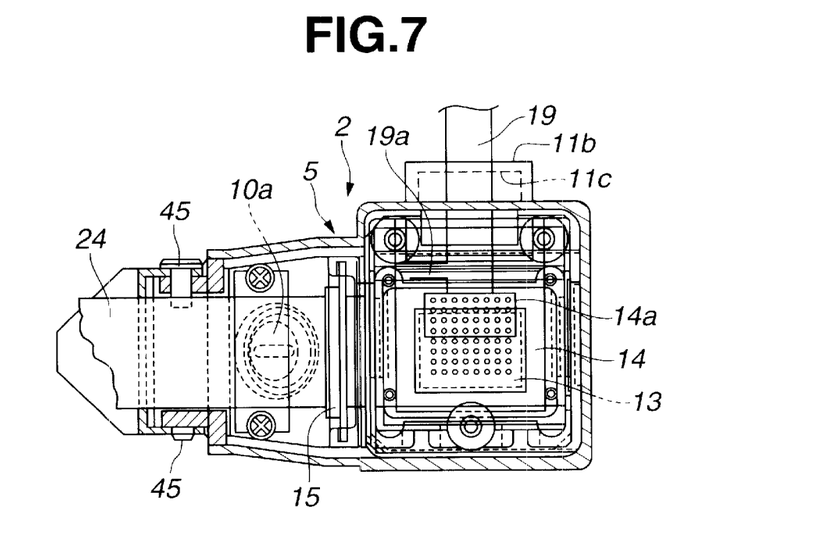
FIG. 7 is a partly enlarged longitudinal sectional view showing an LCD frame included in the head-mounted image display device in accordance with the embodiment.

The LCD drive circuit substrate 15 and LCD substrate 14 are placed in the LCD frame 5 with the main surfaces thereof placed substantially perpendicularly to each other. The substrates 14 and 15 are, as shown in FIG. 6 and FIG. 7, placed mutually closely. This is because since the LCD 13 is driven with a relatively high-frequency signal, the LCD substrate 14 is placed closely to the LCD drive circuit substrate 15 in efforts to minimize radiated noise.

The microphone 18 is incorporated in a microphone attaching member 10a that is located near the arm 3 at vertically almost the middle of the LCD frame 5 while being embedded in the surface of the frame 10 included in the LCD frame 5 which faces the user's head. To whichever of the right and left eyes the head-mounted image display device 1 is disposed for use, the microphone 18 is located at either of laterally symmetric positions and separated by the same distance from the user's mouth. Consequently, the microphone 18 can collect voice nearly in the same state.

Consequently, the microphone 18 will not be separately extended from the arm 3 or the like. The head-mounted image display device can therefore be worn comfortably and can input voice despite the simple configuration. Furthermore, to whichever of the right and left eyes the head-mounted image display device is disposed for use, the head-mounted image display device is located nearly at the same position relative to the right or left eye. This means that the quality of input voice can be stabilized.

Figure 8:
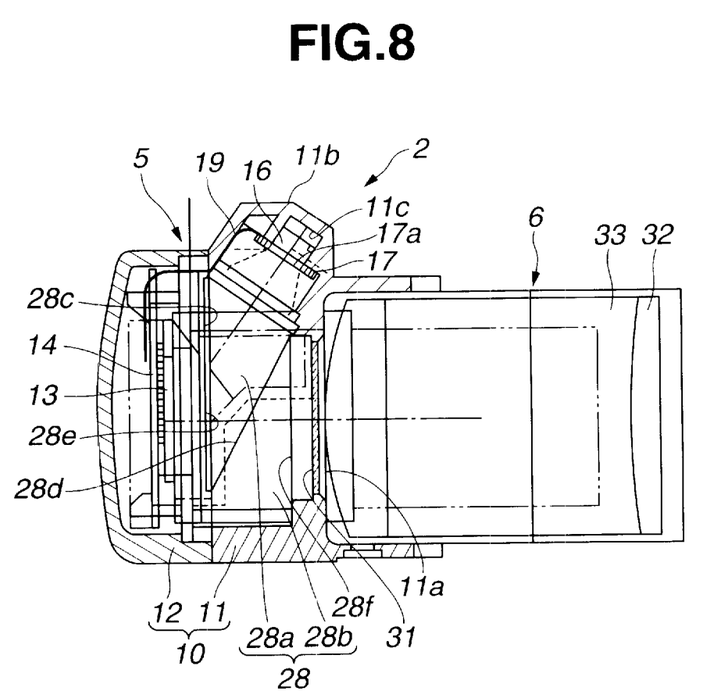
FIG. 8 is a partly enlarged longitudinal sectional view showing the structures of the LCD frame and a main prism included in the head-mounted image display device in accordance with the embodiment.
Figure 9:
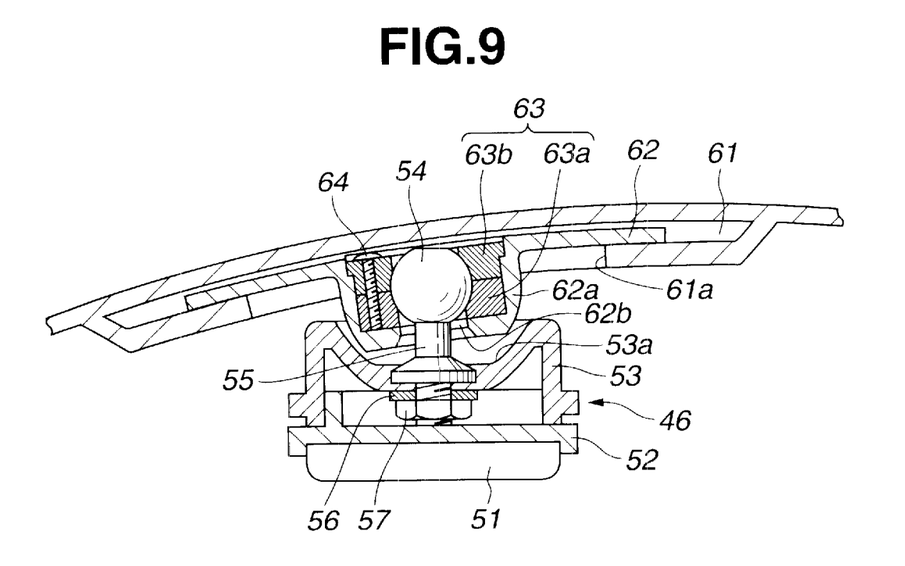
FIG. 9 is a partly enlarged sectional plan view showing the structures of a rocking mechanism and a sliding mechanism which are incorporated in an arm included in the head-mounted image display device in accordance with the embodiment.

The LED substrate 17 has, as shown in FIG. 11, a light passage hole 17a formed in the center thereof. A pair of LEDs 16 is placed at the both sides of the light passage hole 17a. As shown in FIG. 8, the pair of LEDs 16 is placed on a diffusing/reflecting surface 11c formed in a roof-shaped convex part 11b of the first frame 11. The roof-shaped convex part 11b may be fixed to the frame member.

Consequently, illumination light radiated from the LEDs 16 is homogenized and reflected by the diffusing/reflecting surface 11c. Thereafter, the light falls on the illumination prism 28, which is made by bonding two triangular prisms 28a and 28b, through the light passage hole 17a.

Moreover, another diffusing member may be embedded in the light passage hole 17a in order to further improve the homogeneity of illumination light.

The illumination light falling on the illumination prism 28 is emitted from a surface 28e thereof facing the LCD after being reflected from a first reflecting surface 28c and second reflecting surface 28d thereof. Consequently, the reflective LCD 13 is illuminated.

The LCD 13 reflects light rays of red, green, and blue, which are irradiated sequentially, while controlling the reflectance of each pixel location. Light reflected from the LCD 13 falls on the surface 28e of the illumination prism 28 facing the LCD. The light is then transmitted by the second reflecting surface 28d of the illumination prism 28 and emitted from an emitting surface 28f thereof. The light falls on the main prism assembly 6 through the transparent window 31. The transparent window 31 is fixed in the window frame 11a formed in the frame 10 while being sealed up.

The main prism assembly 6 consists of a main prism 32 and a see-through prism 33. The main prism 32 that is a member of an optical system receives light from the LCD frame 5, and reflects the light from a first reflecting surface 32a and a second reflecting surface 32b thereof. Thereafter, the light is emitted from the first reflecting surface 32a, and conducted to a user's eye through an eyepiece window 6a. The see-through prism 33 is bonded to the second reflecting surface 32b of the main prism 32. The see-through prism 33 is another member of the optical system for propagating extraneous light, which comes through an extraneous light incidence window 6b, to the user's eye.

Protective covers 34 and 35 having a barcode inscribed on at least outer surfaces thereof are placed on the eyepiece window 6a and the extraneous light incidence window 6b of the main prism assembly 6, whereby the main prism assembly 6 is kept watertight. Thus, the head-mounted image display device can cope with various use environments including the outdoors. The protective covers 34 and 35 may be subjected to water repellent finishing and thus made waterproof. Otherwise, the protective covers 34 and 35 may be coated in order to prevent reflection or to cut ultraviolet rays. Moreover, the protective covers 34 and 35 may be made detachable so that when they get dirty or are damaged, they can be replaced with new ones.

Figure 10:
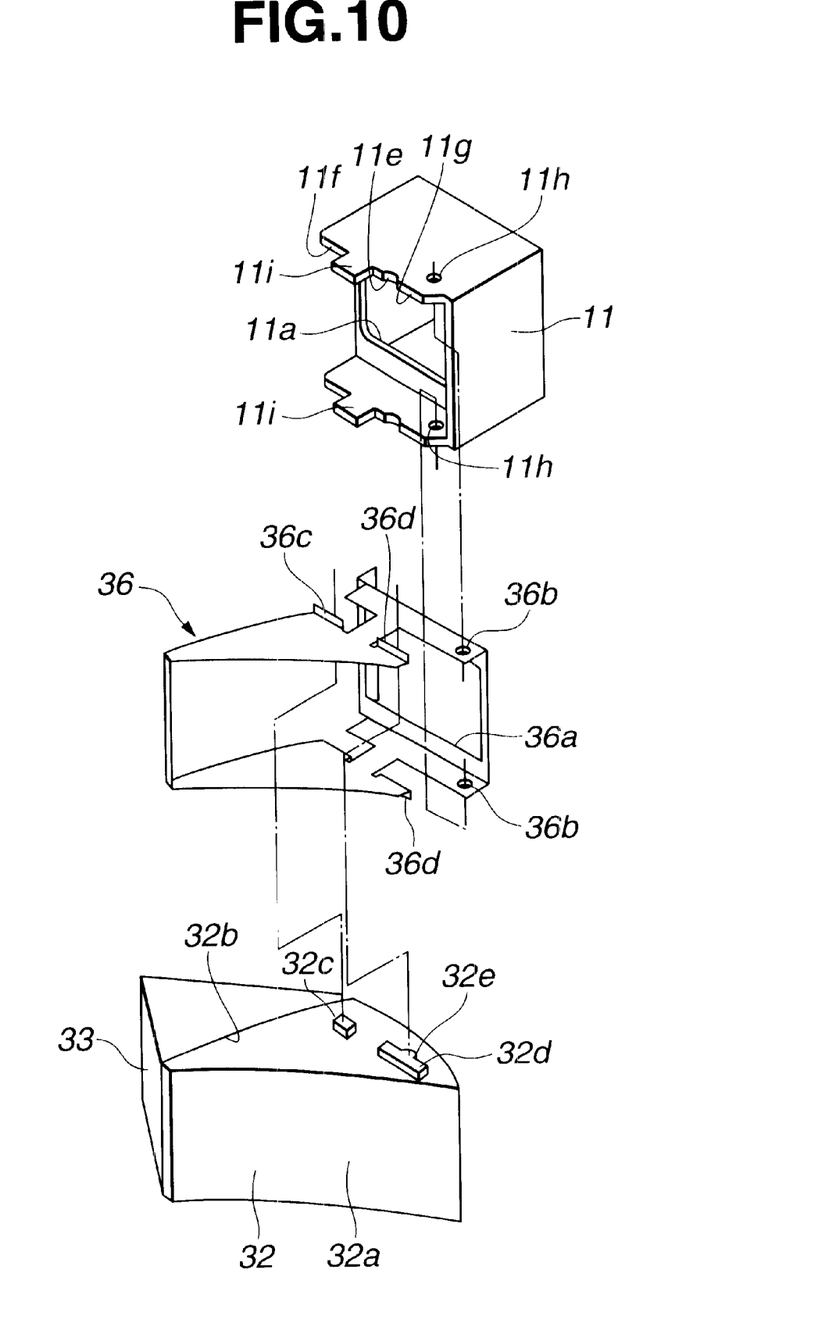
FIG. 10 is an exploded perspective view showing a structure that fixes a main prism and a see-through prism which are included in the embodiment.

The main prism 32 and see-through prism 33 have, as mentioned above, the surfaces thereof bonded to each other, and are thus integrated with each other. As shown in FIG. 10, the main prism 32 has a pair of a first concave part 32c for positioning and a second concave part 32d for positioning formed on each of the upper and lower surfaces thereof. The second concave part 32d has a projection 32e.

The main prism 32 and see-through prism 33 are fixed in the frame 10 included in the LCD frame 5 with a sheet metal member 36 between them. The main prism 32 alone is fixed in the sheet metal member 36. The see-through prism 33 is merely secured by utilizing the bonding (strength) to the main prism 32.

The sheet metal member 36 is, as shown in FIG. 10, shaped to substantially cover the upper and lower surfaces of the main prism 32. The sheet metal member 36 has two pairs of bends 36c and 36d formed as parts of the upper and lower surfaces thereof. The bends 36c and 36d help positioning the main prism 32 by pressing the first convex parts 32c and second convex parts 32d onto parts of the frame 10 which the first and second convex parts contact.

The sheet metal member 36 has a window 36a and screw holes 36b. Light coming from the LCD frame 5 passes through the window 36a. A screw is inserted into each of the screw holes 36b in order to fix the sheet metal member 36 to the frame 10 of the LCD frame 5.

The frame 10 has, as mentioned above, the first frame 11 and second frame 12 joined so that the frame 10 will be substantially sealed. The first frame 11 is, as shown in FIG. 10, realized with a substantially box-like member having the window frame 11a. The first frame 11 has screw holes 11h bored to coincide with the screw holes 36b of the sheet metal member 36. Moreover, the first frame 11 has rectangular convex parts 11i, end surfaces 11f, end surfaces 11g, and concave parts lie. Each of the rectangular convex parts 11i is inserted into a space between each of the two pairs of bends 36c and 36d, thus helping position the first frame 11. Each of the end surfaces 11f contacts the first convex part 32c of the main prism 32, thus helping position the first frame 11. Each of the end surfaces 11g contacts the second convex part 32d of the main prism 32, thus helping position the first frame 11. Each of the concave parts lie is engaged with the projection 32e formed on the second convex part 32d, thus helping position the first frame 11.

Owing to the foregoing structure, in order to construct the main prism assembly 6, the sheet metal member 36 is attached to the main prism 32 so that the first and second convex parts 32c and 32d of the main prism 32 will be contacted to the bends 36c and 36d of the sheet metal member 36. The first frame 11 is externally-mounted on the sheet metal member 36. The projection 32e of the second convex part 32d of the main prism 32 is fitted into the concave part 11e of the first frame 11. Each of the first and second convex parts 32c and 32d is then sandwiched between the bends 36c and 36d of the sheet metal member 36 and the end surfaces 11f and 11g of the first frame 11.

Consequently, the main prism 32 has the upper and lower surfaces thereof clamped by the sheet metal member 36, and is thus vertically positioned. Moreover, the main prism 32 has the first and second convex parts thereof sandwiched between the bends 36c and 36d of the sheet metal member 36 and the end surfaces 11f and 11g of the first frame, and is thus positioned in one direction. Moreover, the projection 32e of the second convex part 32d is fitted into the concave part 11e of the end surface 11g of the first frame, whereby the main prism 32 is positioned in a direction orthogonal to the one direction. Consequently, the spatial arrangement of the main prism is perfectly determined.

Thereafter, screws are inserted into screw holes 11*h* of the first frame 11 and the screw holes 36*b* of the sheet metal member 36, and then tightened. Consequently, the sheet metal member 36 and first frame 11 are integrated with each other.

As mentioned above, one prism alone is fixed, and the other prism is held by utilizing bonding (strength). Consequently, stress applied to the prisms can be lightened to the greatest extent, and a damage caused by resistive strain can be prevented. The sheet metal member 36 is attached to the portion of the main prism that is engaged with the sheet metal member 36. Any screw is not directly inserted into the main prism. Consequently, strain or damage of the prisms can be prevented.

Figure 2:
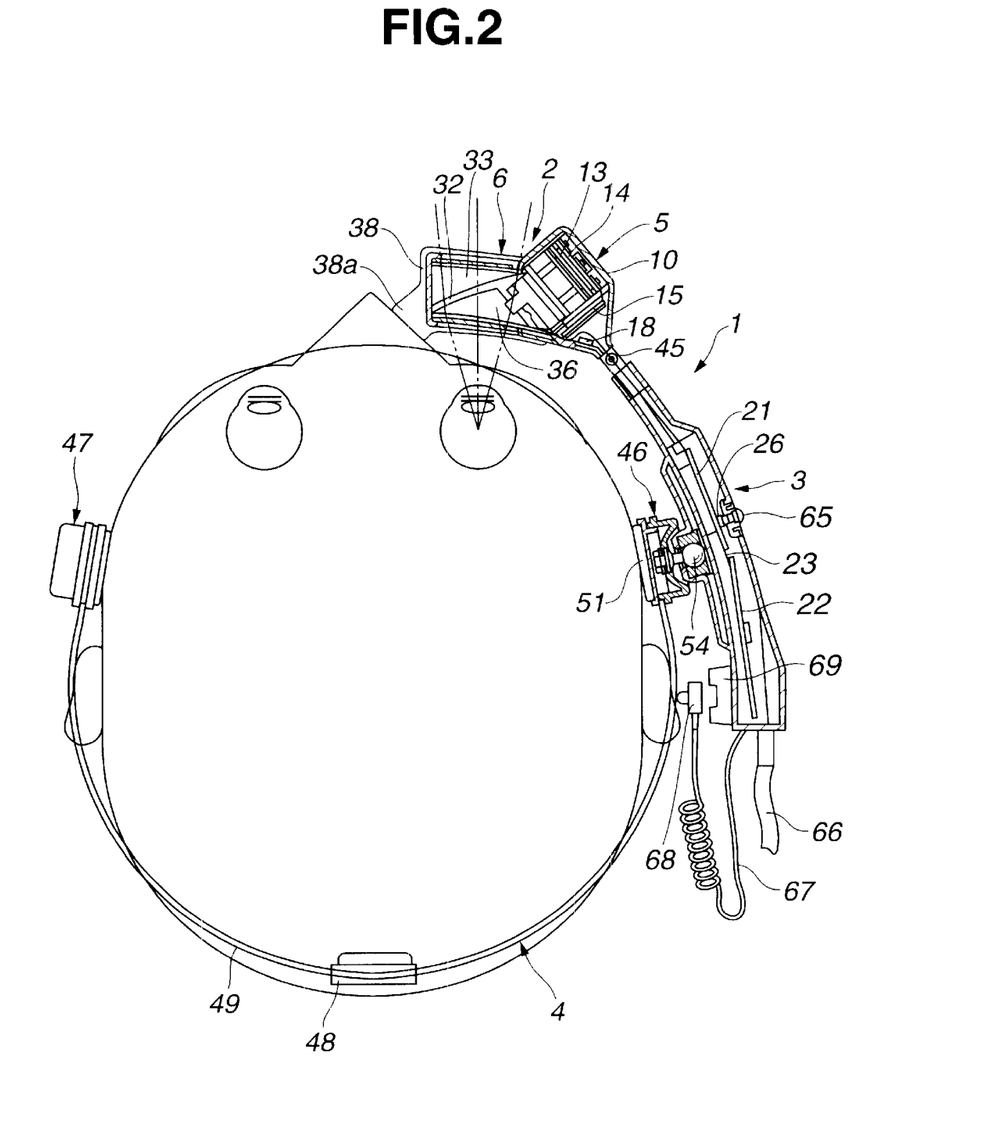
FIG. 2 is a sectional plan view showing the structure of the worn head-mounted image display device in accordance with the embodiment.

The outer surface of the main prism assembly 6 is covered with an elastic member 38 that is detachable. The elastic member 38 serves as a supporting member and is made of, for example, an elastomer. The elastic member 38 has rectangular holes formed to coincide with the eyepiece window 6*a* and extraneous light incidence window 6*b*. Light passes through the rectangular holes. A nose rest 38*a* that contacts a region in which the nasal bone lies subcutaneously close to the skin is projected as shown in FIG. 1 and FIG. 2.

The elastic member 38 may be fixed to the outer surface of the main prism assembly 6.

Figure 12:
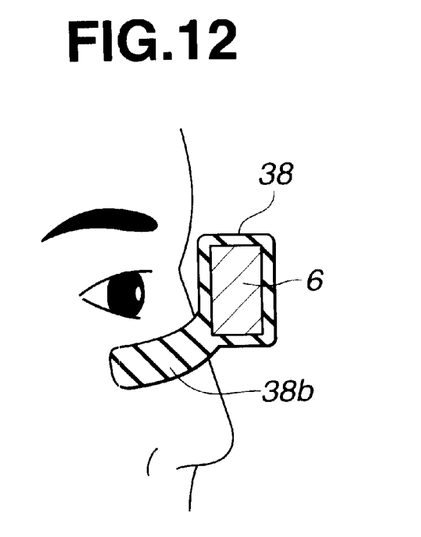
FIG. 12, FIG. 13, and FIG. 14 are longitudinal views showing examples of the structure of an elastic member which is detachably attached to the main prism included in the embodiment.
Figure 13:
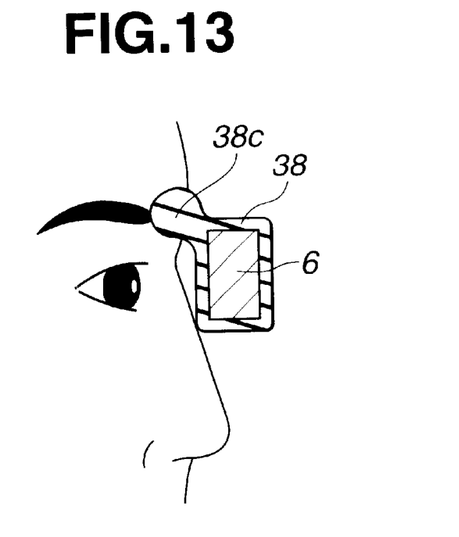

A portion of the elastic member 38 for supporting the main prism assembly 6 at a predetermined position in front of a user's eye is not limited to the nose rest 38*a*. For example, as shown in FIG. 12, a portion 38*b* may be formed so that it will contact a region in which a bone lies subcutaneously close to the skin. Otherwise, as shown in FIG. 13, a portion 32*c* may be formed so that it will contact a region in which the superior ocular bone lies subcutaneously close to the skin.

As mentioned above, the head-mounted image display device 1 is structured so that it will contact a region of the head in which a bone lies subcutaneously close to the skin. Consequently, even if the main prism assembly 6 is pressed abruptly, a user's eye is protected from being pressured. Moreover, the head-mounted image display device 1 can be held on a stable basis.

Figure 14:
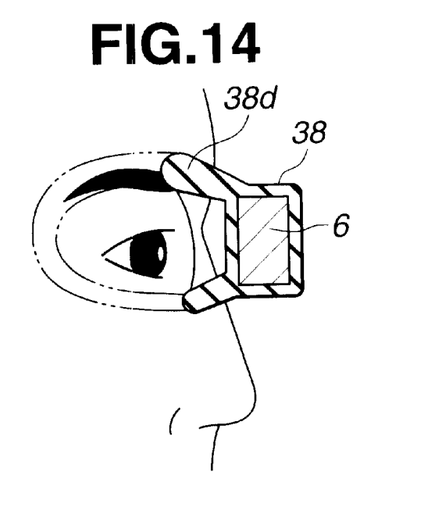

The elastic member 38 may be made available in a plurality of kinds in association with use forms. Otherwise, as shown in FIG. 14, a portion 38*d* may be formed along the perimeter of the main prism assembly 6 in order to block the gap between the perimeter thereof and a user's eye.

In this case, extraneous light that enters through the see-through prism can be intercepted. An image can be clearly viewed on a stable basis irrespective of an indoor or outdoor environment. Furthermore, the distance between a user's eye and the main prism assembly 6 (or a virtual image) can be held nearly constant.

Moreover, the elastic member 38 may be formed to extend along the outer frame of a lens of spectacles. In this case, the head-mounted image display device can be adapted to a user who wears spectacles. Needless to say, a user who does not wear spectacles would find the head-mounted image display device, which has this kind of elastic member 38, more comfortably fit.

Furthermore, the elastic member 38 may be made available in two kinds. One kind of elastic member 38 has a window coincident with the extraneous light incidence window of the prism assembly, and the other kind of elastic member 38 intercepts light coming through the extraneous light incidence window. In this case, a special extraneous light shutout mechanism need not be included. Nevertheless, a mode in which an LCD image is superimposed on an image represented by extraneous light and a mode in which an LCD image alone is viewed can be used selectively.

Figure 5:
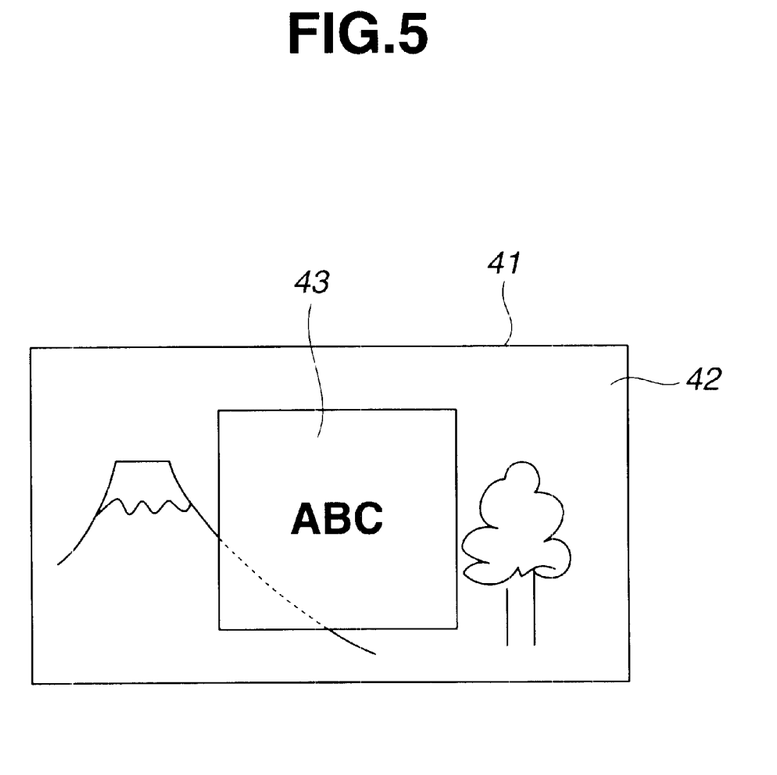
FIG. 5 shows an image displayed while being superimposed on an image, which is represented by extraneous light, by the head-mounted image display device in accordance with the embodiment.

In other words, in the mode in which an LCD image is superimposed on an image represented by extraneous light, a scene 42 represented by extraneous light is, as shown in FIG. 5, superimposed on an image 43 produced by the LCD 13. In the mode in which an LCD image alone is viewed, the scene represented by extraneous light is intercepted, and the LCD image can therefore be viewed more clearly.

The aforesaid viewer 2 is borne by the arm 3 so that it can pivot on a hinge 45.

The aforesaid main circuit board 20 is incorporated in the arm 3. The main circuit board 20 is formed by linking the two rigid circuit boards 21 and 22 using the flexible printed-circuit board 23. Consequently, despite the use of the rigid circuit boards, the arm 3 that is streamlined in conformity with the shape of the user's head can be designed to be thin.

The arm 3 is supported so that the position thereof can be adjusted using a rocking mechanism, which is realized with a ball joint, and a sliding mechanism that is realized with a sliding member and a sliding groove. The rocking mechanism and sliding mechanism will be described with reference to FIG. 9.

The headband 4 includes right and left face pads 46 and 47 and a central head pad 48. The arm 3 is coupled to the face pad 46.

The face pad 46 consists mainly of a pad 51 that comes into contact with the head and a pad frame 52 that bears the pad 51. A housing frame 53 having a concave curved portion 53*a* is engaged with the pad frame 52.

A shaft member 55 having a ball 54 fixed to the distal end thereof is fixed to the housing frame 53 with a washer 56 and a nut 57 between them. The shaft member 55 is extended from the bottom of the concave curved portion 53*a*.

A sliding groove 61 is formed in a portion of the arm 3 facing the user's head. A sliding member 62 is engaged with the sliding groove 61 so that it can slide freely in the longitudinal direction of the arm 3.

A bowl-shaped convex part 62*a* that projects towards the user's head is formed in the middle of the sliding member 62. The bowl-shaped convex part 62*a* juts out of a sliding window 61*a* that is formed to open onto the sliding groove 61.

The bowl-shaped convex part 62*a* has a through hole 62*b* bored in the distal end thereof, and has a ball bearing 63, which bears the ball 54, fixed therein.

The ball bearing 63 consists of a lower ball bearing member 63*a* and an upper ball bearing member 63*b*. In order to assemble the lower and upper ball bearing members, the lower ball bearing member 63*a* is first put in the bowl-shaped convex part 62*a*. Thereafter, the shaft member 55 is passed through the through hole 62*b* of the bowl-shaped convex part 62*a*. The ball 54 is fixed to the distal end of the shaft member 55 using a screw or the like. The upper ball bearing member 63*b* is then placed on the ball 54. A screw 64 or the like is then inserted into the upper and lower ball bearing members Thus, the ball bearing 63 is fixed to the sliding member 62.

Figures 3, 4:
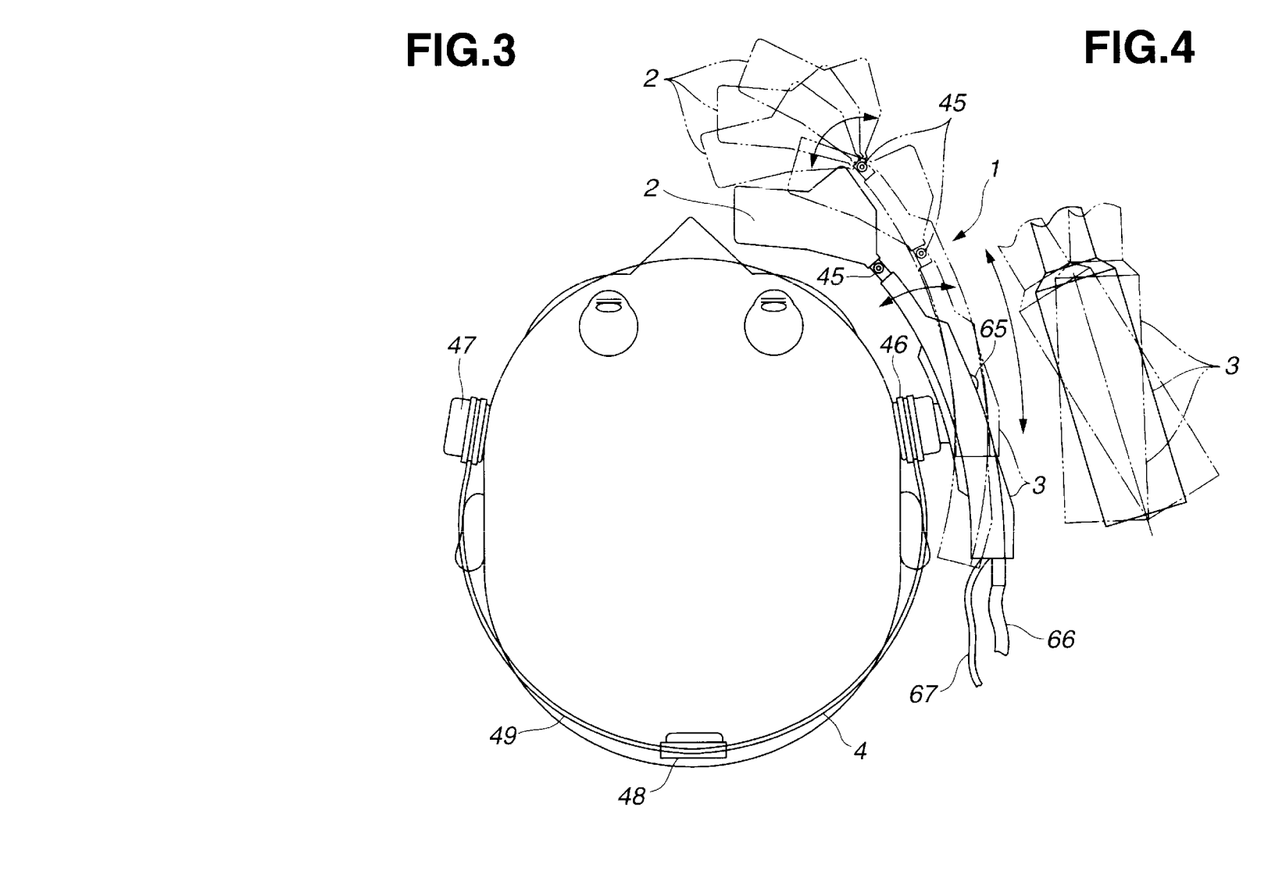
FIG. 3 and FIG. 4 are a plan view and a partial side view showing adjustment that is performed using position adjusting mechanisms included in the head-mounted image display device in accordance with the embodiment.

As mentioned above, three position adjusting mechanisms are included for enabling adjustment of the position of the viewer 2 relative to a user's eye. Consequently, as shown in FIG. 3 and FIG. 4, the viewer 2 can freely pivot on the hinge 45. Moreover, the length by which the arm 3 extends forward relative to the headband 4 can be freely adjusted using the sliding mechanism, and the degree of rocking of the arm 3 in any direction around the ball 54 can be freely adjusted using the rocking mechanism.

The viewer 2 can be freely adjusted so that it will be separated from the user's eye by any distance or it will meet the arm 3 at any angle. Consequently, the head-mounted image display device can be worn by a large number of users who are different from one another in terms of the size of the head and the position of an eye, so that it will be located at a desired most easy-to-see position on any user' head.

Three position adjusting mechanisms are included. The number of position adjusting mechanisms may be varied depending on the degree of necessity of adjustment. Alternatively, two position adjusting mechanisms will do. Otherwise, needless to say, a larger number of adjusting mechanisms may be included.

On the other hand, the plurality of switches 26 mounted on the main circuit board 20 are turned on or off by pressing button members 65 that are exposed on the outer surface of the arm 3 and that are connected to the switches 26.

A main cable 66 over which a video signal and an audio signal are transmitted is extended from the rear end of the arm 3, and routed to an image/voice source such as a personal computer. An earphone cable 67 is extended from the rear end of the arm 3, and an earphone 68 is attached to the distal end of the earphone cable 67. The earphone 68 is of a monophonic type that enables one of the user's ears to hear sounds, so that external sounds can be heard with the other ear. A digital interface for liquid crystal displays (for example, a digital interface in compliance with the TMDS, LVDS, or GVIF) or an analog RGB interface is used to connect the head-mounted image display device to a personal computer.

An earphone mount 69 is formed, close to a user's ear, on the surface of the rear portion of the arm 3 that faces an ear. The earphone 68 is mounted in the earphone mount 69 with a sound generating portion thereof oriented inwards.

Consequently, a user may dismount the earphone 68 from the earphone mount 69 and insert it into his/her ear for use. Otherwise, the user may hear sounds with the earphone 68 held mounted in the earphone mount 69.

Figure 15:
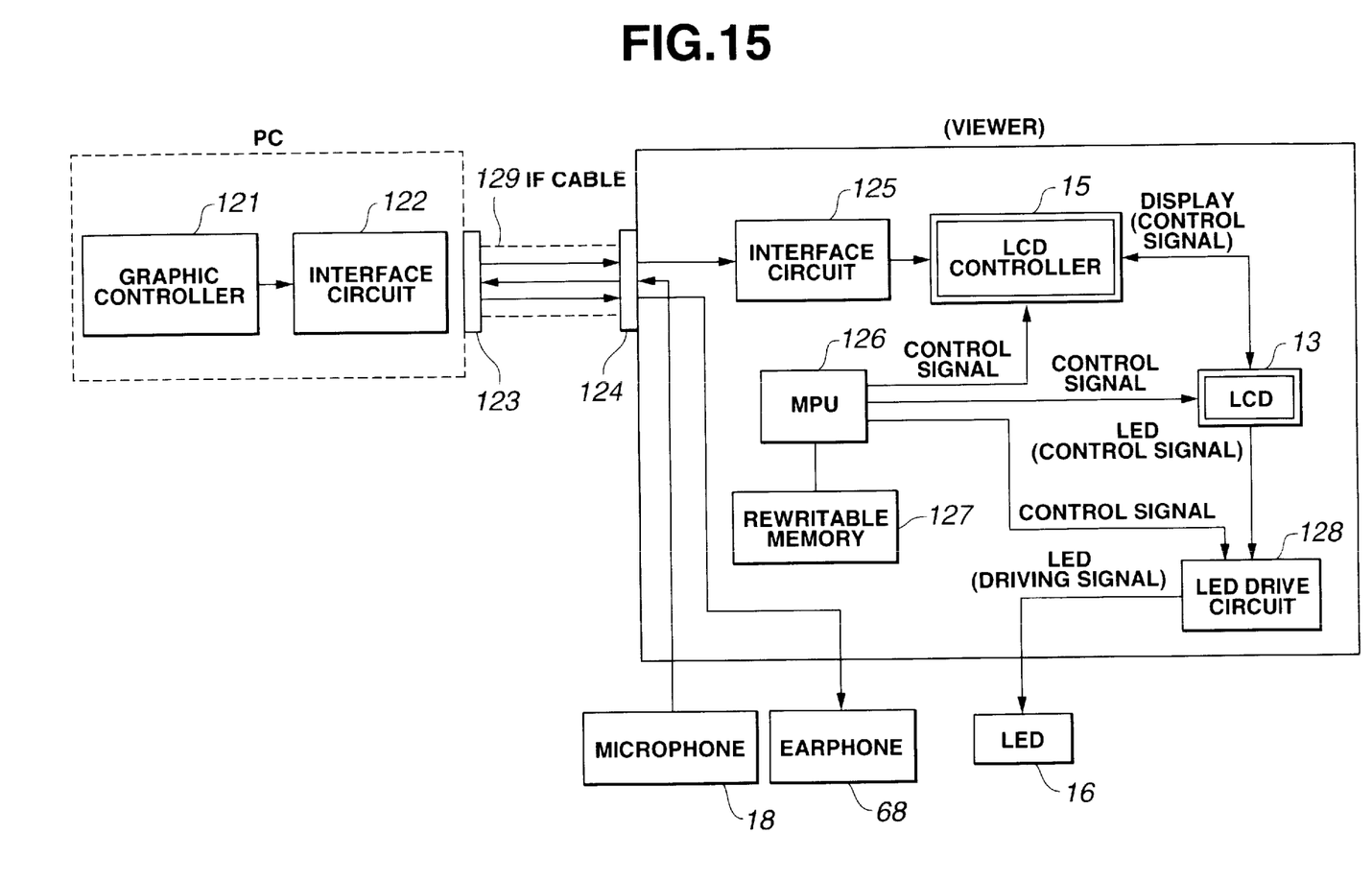
FIG. 15 is a block diagram showing the configuration of the head-mounted image display device in accordance with the embodiment.

A graphic controller 121 is incorporated in a wearable PC 120 or the like, the details of which are not shown, in order to control display of the viewer. Interface circuits 122 and 125 are circuits for transmitting or receiving a high-definition motion picture that expresses a gray scale using 24 bits and complies with the VGA, SVGA, or XGA. The wearable PC 120 has a connector 123, and the viewer has a connector 124. The connectors 123 and 124 are linked by an interface cable 129 that acts as a bus.

The viewer has the interface circuit 125, an LCD controller 15, the LCD 13, the LED drive circuit 128, a microprocessor unit (MPU) 126, and a reprogrammable memory 127. The interface circuit 125 transfers data to or from the PC 120. The LCD controller 15 receives data that is converted from serial data to parallel data by the circuit 125, and controls display of an image on the LCD 13. The LCD 13 displays an image on the LCD 13 under the control of the LCD controller 15. The LED drive circuit 128 drives the LEDs 16 in response to an LED control signal sent from the LCD 13. The MPU 126 controls the whole viewer. The reprogrammable memory 127 stores firmware for controlling display of an image on the viewer.

Due to the control of display extended from the graphic controller 121 incorporated in the PC, the interface circuit 122 converts parallel data into serial data. The display data is received by the interface circuit 125 incorporated in the viewer over the interface cable 129. The interface circuit 125 converts the serial data into parallel data, and transmits the display data to the LCD controller 15.

Initial data concerning the MPU 126, LCD controller 15, and LCD 13, user-specified data including a luminance and the contrast of an image, and information necessary to control display are stored in the reprogrammable memory 127. The reprogrammable memory 127 that is reprogrammable is realized with, for example, an EPROM, an EEPROM, or a flash memory. The reprogrammable memory 127 may be reprogrammed through an operating interface with the cover of the viewer opened. Otherwise, a memory module realizing the reprogrammable memory 127 may be replaced with a memory module with a receptacle. Thus, firmware for controlling display can be updated. The cover of the viewer may not be opened in order to pass control from the PC 120, but an initial program loader (IPL) residing in the memory 127 may be activated using an install program, whereby the reprogrammable memory 127 may be reprogrammed.

In the example shown in FIG. 15, the reprogrammable memory 127 is separated from the MPU 126. Alternatively, the memory 127 may be incorporated in the MPU 126.

This simplifies addition or modification of any feature or bug patches. The viewer which has the reflective LCD and in which the reprogrammable memory 127 can be updated has been described so far. The viewer may be adapted to a spectacles-type head-mounted image display device (transmissive LCD) that the present applicant has already proposed in Japanese Patent Application No. 11-177253.

The headband 4 has the right and left face pads 46 and 47 and the central head pad 48 attached to a sheet metal member 49 that is elastic and shaped substantially like an arc. As mentioned above, the face pad 46 is coupled to the arm 3 with a ball joint between them.

The headband 4 is worn on the head over the occipital region between the temporal regions. The headband 4 is held on the head due to the elasticity of the sheet metal member 49. However, how the headband is worn on the user's head is not limited to the above method. For example, the headband may be worn over the parietal region between the temporal regions.

Moreover, when a user wants to view an image with his/her left eye, the worn state of the head-mounted image display device shown in FIG. 2 is reversed 180°. Namely, the head-mounted image display device is worn on the left region of the head. The button member 65 is operated in order to rotate 180° an image displayed on the LCD 13 so that the image to be viewed will be displayed at a proper position. An image rotating means for rotating an image is realized by the electric circuit boards shown in FIG. 11. As a variant, a signal produced responsively to a operation performed on the button member 65 may be sent to a personal computer or the like (not shown). An image may then be rotated in the personal computer, and viewed on the head-mounted image display device.

The personal computer is not limited to a notebook type personal computer or a desktop personal computer but may be a portable personal computer or a wearable personal computer.

In the aforesaid viewer 2, the LCD 13, LED substrate 17, LCD drive circuit, and illumination prism 28 are put in the frame 10 that is substantially sealed. Alternatively, these components may not be put in the sealed structure, but the LCD 13 and LED substrate 17 alone may be put therein or the LCD 13, LED substrate 17, and LCD drive circuit may be put therein. Whichever of the components are put in the frame 10 that is substantially sealed may be determined according to the arrangement of circuit boards or the required degree of waterproofness or dustproofness.

According to the present embodiment, more than two position adjusting mechanisms are included for enabling adjustment of the position of the viewer relative to a user's eye. Therefore, at whatever position the headband is worn in order to cope with a difference of a user from another individual, the head-mounted image display device can be positioned at an optimal position for image display.

Moreover, the LED substrate and microphone are connected through a connector. This simplifies maintenance and repair of a failure.

One of two prisms that are bonded to each other in order to construct an optical system is fixed in the frame, and the other prism is held by utilizing the bonding (strength). The strain or damage of a prism can be avoided. Furthermore, the prism is fixed in the frame while being merely clamped by the sheet metal member. Consequently, the strain or damage of a prism can be prevented more reliably.

Furthermore, illumination light emanating from the LEDs is conducted to the reflective LCD via the illumination prism. Compared with when illumination light is conducted directly to the reflective LCD, the head-mounted image display device can be manufactured as a more compact product.

Light emanating from the LEDs is temporarily reflected from the diffusing/reflecting surface formed in the frame in order to be thus homogenized. Thereafter, the light is irradiated to the LCD. Despite the simple structure, therefore, irregular emission of light from the LEDs can be coped with and a loss in light can be prevented. Moreover, as a variant, light emanating from the LEDs may be conducted directly to the illumination prism, and the diffusing/reflecting surface is formed in the illumination prism. Nevertheless, the variant can provide the same advantages as the present embodiment.

Moreover, the frame is made of a metal or any other material that does not transmit light. Leakage of light emanating from the LEDs therefore can be prevented and the light can be reflected at a high reflectance. Consequently, a high luminance can be ensured. In addition, the adoption of a metal facilitates heat dissipation.

The outer surface of the main prism is covered with an elastic member made of an elastomer or the like. Moreover, the nose rest that contacts a region in which the nasal bone lies subcutaneously close to the skin is formed with the elastic member. The nose rest can therefore deform in conformity with the shape of a region which the nose rest contacts, and absorb extraneous force. This results in improved comfort in wearing the head-mounted image display device.

The elastic member is attachable and detachable. Therefore, even when the same head-mounted image display device is worn by a plurality of users, if the elastic member is renewed for each user, the head-mounted image display device can be kept sanitary. Moreover, even if the elastic member must be replaced with a new one because it is damaged or soiled, the elastic member can be renewed readily. Various elastic members of different shapes may be made available. In this case, the head-mounted image display device can be flexibly worn by users who have individual differences or in different use forms.

The present invention is not limited to the aforesaid embodiment. Needless to say, various modifications and applications can be achieved without a departure from the gist of the invention.

Industrial Applicability

According to the present invention, there is provided a compact comfortably-wearable head-mounted image display device. Herein, since a microphone is mounted in a frame member, the microphone will not be extended using a separate arm member or the like.

Moreover, whether the head-mounted image display device is disposed opposite the user's right eye or left eye, the user's mouth and the microphone have nearly the same positional relationship, though the microphone is located on the right or left side of the user's mouth. Voice can therefore be collected without the necessity of causing the user to feel that something is wrong.

Furthermore, a supporting member is used to place a viewer so that the viewer will have a predetermined positional relationship to the user's eye. The viewer will therefore not be displaced, and the user can view an image on a stable basis. The head-mounted image display device is thus compact and comfortably wearable.

The supporting member is made of an elastic material. This leads to improved comfort in wearing the head-mounted image display device. Even if extraneous force is applied unexpectedly, the influence of the extraneous force can be alleviated.

In addition, the supporting member is contacted a region in which at least one of the nasal bone, cheekbone, and superior ocular bone lies subcutaneously close to the skin. Even if extraneous force is applied unexpectedly, the user's eye can be protected reliably.

Furthermore, the supporting member is formed along the perimeter of the viewer in order to block the gap between the viewer and user's eye. This enables the user to view an image on a stable basis while being unaffected by an ambient environment. Moreover, the viewer will not lie very closely to the user's eye.

The supporting member has a portion that covers an optical system. The optical system can therefore be protected. Moreover, the supporting member is attachable or detachable. Even if the head-mounted image display device is worn by a plurality of users, it can be kept sanitary. When the supporting member is shaped to cope with a difference of a user from another individual, the user can wear the head-mounted image display device more comfortably.

An electric circuit board for a display element and an electric circuit board for illumination are connected to each other through a connector. The circuit boards can therefore be separated from each other for the purpose of maintenance or repair of a failure.

Furthermore, the electric circuit board for illumination is held on a diffusing/reflecting surface of a frame member. This enables illumination of homogeneous light without causing irregular emission of light.

In addition, the frame member bears an image display element so that the image display element will be at least substantially sealed. Consequently, the viewer is substantially sealed. The head-mounted image display device is therefore kept waterproof or dustproof even when used outdoors.

What is claimed is:

1. A head-mounted image display device having a viewer located in front of a user's eye to make an image viewable wherein:

said viewer comprises:
  an image display element,
  an optical system for forming an image, said image being displayed on said image display element allowing said image to be viewed, and
  a frame member for bearing said image display element at a predetermined position relative to said optical, system;
said head-mounted image display device further comprising:
  an electric circuit board for a display element on which said image display element is mounted,
  an illuminating member for illuminating said image display element,
  an electric circuit board for illumination on which said illuminating member is mounted, and
  a connector through which said electric circuit board for a display element and said electric circuit board for illumination are connected and disconnected from each other;
wherein said electric circuit board for illumination is held in at least one of said frame member and an illuminating member-fixing member that is fixed in said frame member, and;
a surface of a portion of said frame member of illuminating member-fixing member that holds said electric circuit board for illumination is formed as a diffusing/reflecting surface that homogenizes and reflects light emanating from said illuminating member.

2. A head-mounted image display device of a monocular type, comprising,
  a viewer having an image display element;
  an optical system for forming an image displayed on said image display element so that said image can be viewed;
  a frame member for bearing said image display element so that said image display element will be located at a predetermined position relative to said optical system;
  an arm which bears said viewer so that an eyepiece window of said viewer may be located in front of one of a user's right and left eyes; and
  a support member which is used to wear said arm on a user's head;
wherein a region of said user's head on which said support member is worn may be reversed laterally as said user may wish such that said eyepiece window of said viewer may be located in front of the other of said user's right and left eyes with which said user is allowed to view said image.

3. The head-mounted image display device according to claim 2, wherein:
  said arm and said support member are joined using a rotatable joint mechanism.

4. The head-mounted image display device according to claim 3, further comprising:
  at least one circuit board for said image which is to be displayed on said image display element, said image being rotated 180° at least one of vertically and laterally.

5. The head-mounted image display device according to claim 4, wherein:
  a microphone is provided in said frame member.

6. The head-mounted image display device according to claim 2, further comprising:
  at least one circuit board for said image which is to be displayed on said image display element, said image being rotated 180° at least one of vertically and laterally.

7. The head-mounted image display device according to claim 6, wherein:
  a microphone is provided in said frame member.

* * * * *